US007278161B2

(12) United States Patent
Lingafelt et al.

(10) Patent No.: US 7,278,161 B2
(45) Date of Patent: Oct. 2, 2007

(54) PROTECTING A DATA PROCESSING SYSTEM FROM ATTACK BY A VANDAL WHO USES A VULNERABILITY SCANNER

(75) Inventors: Charles Steven Lingafelt, Durham, NC (US); Nigel Birkbeck Yell, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 09/968,057

(22) Filed: Oct. 1, 2001

(65) Prior Publication Data
US 2003/0065945 A1  Apr. 3, 2003

(51) Int. Cl.
*G06F 21/00* (2006.01)
(52) U.S. Cl. .......................................... 726/23; 713/189
(58) Field of Classification Search ................ 713/200, 713/201, 189; 726/23
See application file for complete search history.

(56) References Cited

U.S. PATENT DOCUMENTS

| 5,892,903 | A | * | 4/1999 | Klaus .......................... 713/201 |
| 5,898,836 | A | | 4/1999 | Freivald et al. ......... 395/200.48 |
| 5,931,946 | A | * | 8/1999 | Terada et al. ................ 713/201 |
| 5,978,842 | A | | 11/1999 | Noble et al. ................. 709/218 |
| 6,012,087 | A | | 1/2000 | Freivald et al. ............. 709/218 |
| 6,148,339 | A | | 11/2000 | Nagamatsu et al. ......... 709/224 |
| 6,163,844 | A | | 12/2000 | Duncan et al. .............. 713/201 |
| 6,298,445 | B1 | * | 10/2001 | Shostack et al. .............. 726/25 |
| 6,301,668 | B1 | * | 10/2001 | Gleichauf et al. ........... 713/201 |
| 6,304,975 | B1 | * | 10/2001 | Shipley ........................ 726/22 |
| 6,550,012 | B1 | * | 4/2003 | Villa et al. ................... 713/201 |
| 6,611,869 | B1 | * | 8/2003 | Eschelbeck et al. ......... 709/228 |
| 6,725,377 | B1 | * | 4/2004 | Kouznetsov ................. 726/23 |
| 6,892,237 | B1 | * | 5/2005 | Gai et al. .................... 709/224 |
| 7,020,783 | B2 | * | 3/2006 | Vange et al. .................... 726/5 |
| 2002/0069356 | A1 | * | 6/2002 | Kim ............................ 713/160 |
| 2002/0073337 | A1 | * | 6/2002 | Ioele et al. .................. 713/201 |

FOREIGN PATENT DOCUMENTS

WO       0010093        2/2000

(Continued)

OTHER PUBLICATIONS

Nahum, E. et al. "Performance Issues in WWW Servers", Performance Evaluation Review, vol. 27, No. 1, pp. 216-217, Jun. 1999.

(Continued)

*Primary Examiner*—Kambiz Zand
*Assistant Examiner*—Andrew L Nalven
(74) *Attorney, Agent, or Firm*—Schmeiser, Olsen & Watts; John R. Pivnichny; David R. Irwin

(57) ABSTRACT

Method and apparatus for protecting a data processing system such as an Internet server from attack by a vandal who uses an offensive vulnerability scanner to find an externally visible vulnerability of the data processing system. The method includes determining an externally visible vulnerability using a defensive vulnerability scanner, configuring an intrusion detection system to detect a network flow associated with the vulnerability, and blocking that flow by a firewall or a router. The apparatus includes a defensive vulnerability scanner that finds an externally visible vulnerability and provides a description of the vulnerability, an intrusion detection system that detects a network flow that satisfies the description, and a firewall or a router that blocks the flow responsive to detection of the flow by the intrusion detection system.

3 Claims, 2 Drawing Sheets

FOREIGN PATENT DOCUMENTS

WO 0042528 7/2000

OTHER PUBLICATIONS

Feldmann, A. et al. "Efficient Policies for Carrying Web Traffic Over Flow-Switched Networks", IEEE/ACM Transactions on Networking, vol. 6, No. 6, pp. 673-685, Dec. 1998.

Research Disclosure "Method and System for Managing Network Devices via the Web", No. 41425 p. 1367, Oct. 1998.

Marugama, K. et al. "System and Method for Regulating Incoming Traffic to a Server Farm", IBM Patent Application, U.S. Appl. No. 09/919,037, filed Feb. 20, 2001.

Thubert, P. et al. "Router Monitoring", IBM Patent Application, U.S. Appl. No. 09/537,242, filed Mar. 28, 2000.

* cited by examiner

PROTECTING A DATA PROCESSING SYSTEM FROM ATTACK BY A VANDAL WHO USES A VULNERABILITY SCANNER

FIELD OF THE INVENTION

The present invention applies generally to the field of data processing security, and more particularly to method and apparatus for protecting a data processing system such as an Internet server from attack by vandals who find vulnerabilities in data processing systems by using vulnerability scanners.

BACKGROUND

As data processing activities become ever more important to our society, the reward for subverting these activities evidently grows proportionally in the mind of vandals who are both technically proficient and socially dysfunctional. Although the number of such vandals is relatively small, they do untold damage by spreading computer viruses, altering records, obliterating patiently collected databases, and so forth.

As a result, a number of useful tools have been developed to combat electronic vandalism. A recent advance by toolmakers is their development of vulnerability scanners. Vulnerability scanners probe a data processing system such as a host computer or an Internet server to uncover externally visible vulnerabilities, i.e., security vulnerabilities that can be detected and therefore exploited by someone interacting with the data processing system from the outside.

Scanners probe according to known vulnerabilities, for example those listed in the Common Vulnerabilities and Exposures list sponsored by MITRE Corporation. Known vulnerabilities may include server misconfigurations, buffer-overflow problems that make operating systems vulnerable to denial-of-service attacks, insecurities that cause operating systems to respond to vandals' prodding in ways that subtly identify the operating system's release level and thereby reveal its entire spectrum of vulnerabilities, and so forth.

When the vulnerability scanner determines that a data processing system has a particular vulnerability, the scanner reports that vulnerability to an administrator. Once so informed by the vulnerability scanner, the administrator may take preventive action, for example by installing an operating-system patch, by reconfiguring an improperly configured server, and so forth. Thus the information provided by the vulnerability scanner is invaluable in ferreting out externally visible vulnerabilities, so that they may be eliminated. Nevertheless, the data processing system continues to be at risk until the administrator actually takes the required action to eliminate the externally visible vulnerability.

Unfortunately, a vandal as well as an administrator may exploit the power of a vulnerability scanner to ferret out weakness in a data processing system. For example, the vandal may use the same scanner as that used by the administrator, identify exactly the same externally visible vulnerability as that identified by the administrator, and with benefit of this knowledge attack the data processing system on its weakest front. Because of the scanner's power to find externally visible vulnerabilities, the vandal's attack is highly likely to succeed if it is launched before the administrator acts to eliminate the vulnerability.

So, in a logical sense, tool makers and vandals play a game: an advance of one camp is countered by an advance of the other. Here, the toolmaker's legitimate advance—the vulnerability scanner—plays as well into the illegitimate hands of the vandal. Consequently, there is a need to protect a data processing system such as an Internet network server from attacks by vandals who use vulnerability scanners to identify the data processing system's externally visible vulnerabilities.

SUMMARY

The present invention protects a data processing system such as an Internet server from attack by a vandal who uses a vulnerability scanner to find the data processing system's externally visible vulnerabilities and tailors the attack to exploit these vulnerabilities.

One embodiment of the invention is a method. The inventive method includes the steps of determining an externally visible vulnerability using a vulnerability scanner, configuring an observation engine such as an intrusion detection system to detect an inbound network flow that exploits the externally visible vulnerability, and, when such a network flow is detected by the observation engine, blocking that flow by a blocker such as a firewall or a router.

Another embodiment of the invention is apparatus for protecting a data processing system such as an Internet server from attack by a vandal who uses a vulnerability scanner. The inventive apparatus includes a vulnerability scanner that finds an externally visible vulnerability of the data processing system and provides a description of the vulnerability in terms of a network flow, which may be the flow used by the vulnerability scanner to detect the vulnerability; an observation engine such as an intrusion detection system that detects an inbound network flow that satisfies the description of the vulnerability; and a blocker such as a firewall or a router that blocks the network flow that satisfies the description of the vulnerability, responsive to detection of the flow by the observation engine.

Thus the present invention uses the power of a vulnerability scanner proactively to thwart a vandal's attempt to intrude upon a data processing system, rather than limit the use of the vulnerability scanner to calling an administrator's attention to a need to install a software patch or the like. As a result, the present invention closes the vandal's window of opportunity to exploit an externally visible vulnerability before the administrator upgrades the data processing system. These and other aspects of the invention will be more fully appreciated when considered in light of the following detailed description and drawings.

DETAILED DESCRIPTION

The present invention enlists the power of a defensive vulnerability scanner to combat a vandal who himself uses an offensive vulnerability scanner to tailor a malicious attack upon a data processing system. According to the present invention, a defensive vulnerability scanner finds an externally visible vulnerability of the data processing system, and describes a network flow associated with the vulnerability to an observation engine such as an intrusion detection system. When the observation engine detects an incoming instance of the flow described by the vulnerability scanner, the observation engine instructs a blocker such as a firewall or a router to block the flow, thereby preventing the flow from reaching the protected data processing system.

Figure 1:
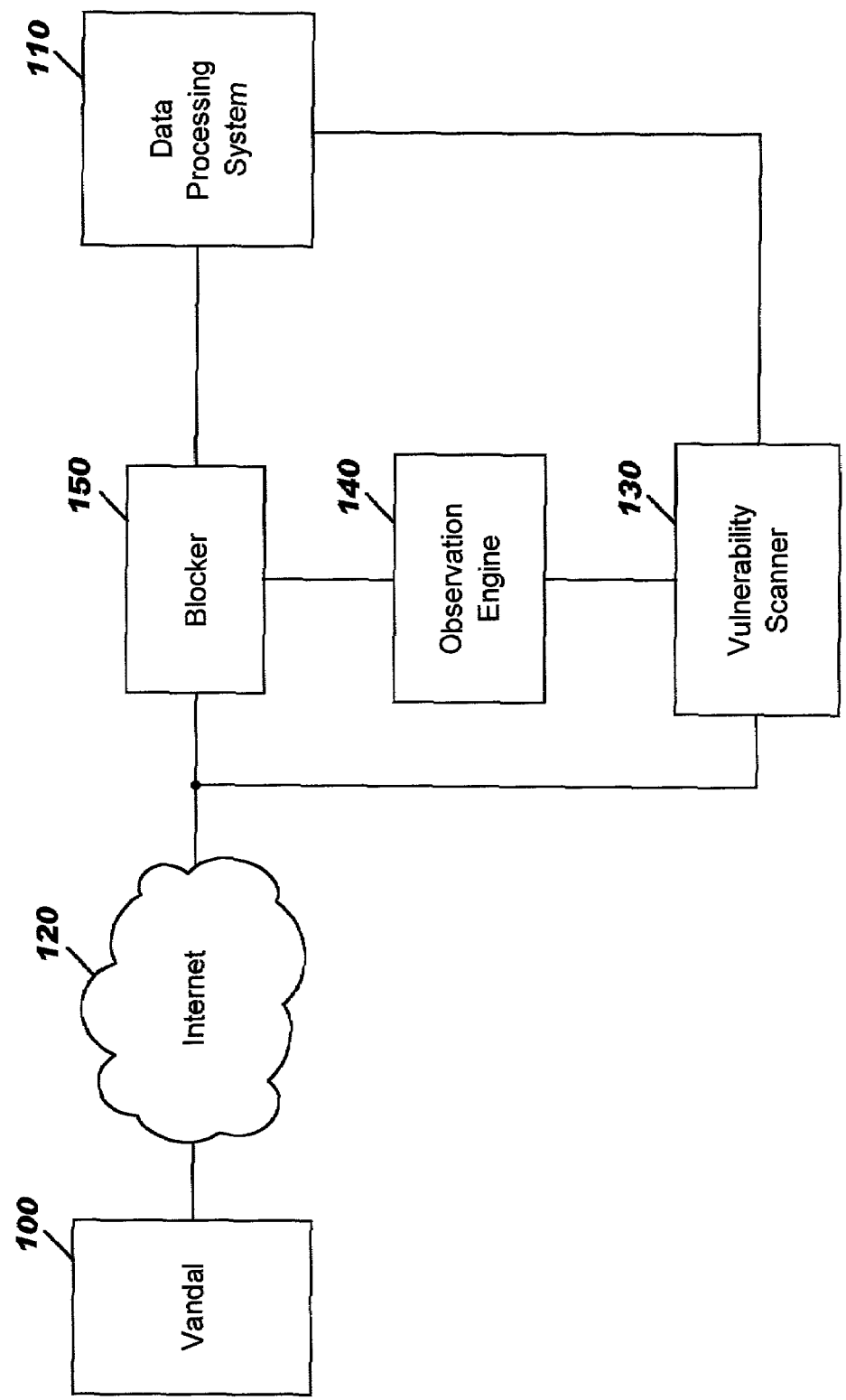
FIG. 1, which is a block diagram, illustrates aspects of the structure of an exemplary embodiment of the invention.

FIG. 1 is a block diagram that shows aspects of the structure of an exemplary embodiment of the present invention. In FIG. 1, a vandal 100 attempts to attack a protected data processing system 110 through the Internet 120 or other communication network. The protected data processing system 110 may include an Internet web server or other data processing equipment.

In order to make his attack as effective as possible, the vandal 100 may attempt to discover weaknesses in the data processing system 110 by using his own vulnerability scanner (not shown), called here an "offensive" vulnerability scanner in recognition of its use by the vandal 100. Weaknesses found by the vandal 100 in this manner are called here "externally visible vulnerabilities." The present invention includes no requirement, however, that the vandal 100 actually find vulnerabilities of the data processing system in this manner, and the term "externally visible vulnerabilities" includes all vulnerabilities of the data processing system 110 that could have been found in practice or in principle by the vandal 100 using an offensive vulnerability scanner. For example, the vandal 100 might have prior knowledge of a particular externally visible vulnerability, and tailor an attack accordingly, without actually probing the data processing system 110 with an offensive vulnerability scanner.

The data processing system 110 is protected from the vandal 100 by protective equipment that includes a defensive vulnerability scanner 130 (as a convenience, the descriptor "defensive" is now dropped). In general, there are two kinds of vulnerability scanners, network scanners and host scanners; the vulnerability scanner 130 may be of either kind, or may include attributes of both. An example of a network vulnerability scanner is the Cisco Secure Scanner™ of Cisco Systems, San Jose, Calif. (http://www.cisco.com); an example of a host vulnerability scanner is the Enterprise Security Manager™ of Symantec Corporation (formerly Axent), Cupertino, Calif. (http://www.symantec.com). Mention here of the Cisco and Symantec products is, of course, illustrative rather than limiting. In the future there may be application scanners also, and the present invention is intended to encompass these as well as network scanners and host scanners.

The vulnerability scanner 130 probes the data processing system 110 according to known externally visible vulnerabilities, for example vulnerabilities included in the Common Vulnerabilities and Exposures list sponsored by MITRE Corporation, looking for weakness. To do so, the vulnerability scanner 130 may draw upon a vulnerabilities database accessed through the Internet 120. Because the vulnerabilities database may be updated frequently, the vulnerability scanner 130 may have state-of-the-art knowledge.

Output from the vulnerability scanner 130 may serve as input to an observation engine 140. The observation engine 140 may be an intrusion detection system, a sniffer, a passive flow monitor, or the like. Input to the observation engine 140 describes network flows determined by the vulnerability scanner 130 to be associated with weaknesses of the data processing system 110. These flows may be a subset of the flows used by the vulnerability scanner 130 to probe the data processing system 110. For example, the vulnerability scanner 130 might report the following:

01.02.03.04: (medium) (HTTP/8080/TCP) Server accepts the dot-dotURL "/../../../../etc/password"

This exemplary report describes a network flow associated with an externally visible vulnerability of medium importance, at destination address 01.02.03.04, using TCP protocol, port 8080, HTTP flow with a text string "/../../../../../../etc/password". In other cases, input to the observation engine 140 may be mapped from output of the vulnerability scanner 130, according to known characteristics of the particular externally visible vulnerability, for example according to information provided by the Common Vulnerabilities and Exposures list mentioned earlier. Output of the observation engine 140 may serve as input to a blocker 150. The blocker 150 may be a firewall, a router, software executed by the data processing system 110, a load balancer, or the like. The blocker 150 may, as needed, block or filter flows from the Internet 120 that would otherwise reach the data processing system 110.

Figure 2:
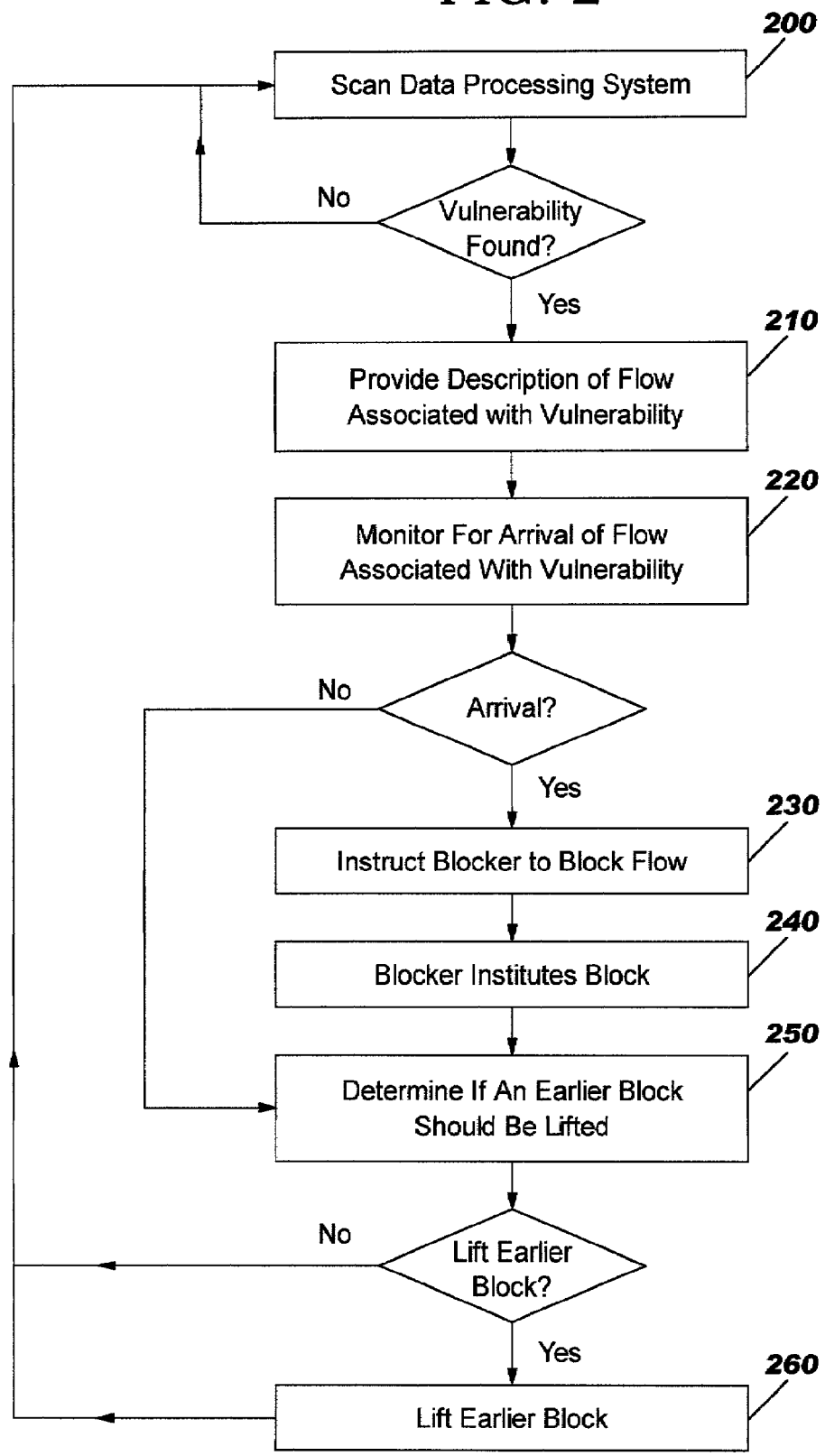
FIG. 2, which is a flowchart, illustrates aspects of the operation of an exemplary embodiment of the present invention.

FIG. 2 is a flowchart that describes aspects of the operation of an exemplary embodiment of the present invention, and is suitable for describing aspects of the operation of the exemplary structure shown in FIG. 1. As shown in FIG. 2, the vulnerability scanner 130 scans the data processing system 110, probing for externally visible vulnerabilities (step 200). If no externally visible vulnerabilities are found, the vulnerability scanner 130 continues to probe at appropriate intervals (step 200).

Otherwise (i.e., an externally visible vulnerability is found), the vulnerability engine 130 provides, to the observation engine 140, a description of a network flow that is associated with the externally visible vulnerability (step 210). The description may be, for example, the network flow used by the vulnerability scanner 130 to reveal the externally visible vulnerability. The observation engine 140 monitors inbound network flows (i.e., flows from the Internet 120 to the data processing system 110) that are addressed to the data processing system 110, awaiting arrival of an instance of a flow that satisfies the description provided by the vulnerability scanner 130 of the network flow associated with the externally visible vulnerability (step 220). When an instance of the flow associated with the externally visible vulnerability arrives, the observation engine 140 instructs the blocker 150 to block the flow associated with the externally visible vulnerability (step 230). In response, the blocker 150 institutes the required block (step 240), thereby preventing the flow associated with the externally visible vulnerability from reaching the data processing system 110.

A determination is made by the observation engine 140 or by other logic (for example, logic in the blocker 150, or in the vulnerability scanner 130, or in the data processing system 110) whether any earlier-instituted blocks should be lifted (step 250). An earlier-instituted block may be lifted, for example, after expiration of a prescribed interval of time following the last known arrival of the blocked flow, or after an appropriate software patch or upgrade has been installed. If an earlier-instituted block should be lifted, the earlier-instituted block is lifted (step 260). Following the lifting of the earlier-instituted block (step 260), or in the case where no earlier-instituted block is ready to be lifted, the observation engine 140 continues to scan the data processing system 110, probing for externally visible vulnerabilities (step 200).

Otherwise (i.e., absent the arrival of a flow associated with an externally visible vulnerability, which in FIG. 2 is the negative logical branch that follows step 220), a determination is made whether any earlier-instituted blocks should be lifted as described above (step 250), and the method continues as described above according to the outcome of this determination.

From the foregoing description, those skilled in the art will appreciate that the present invention provides method and apparatus for protecting a data processing system, such as an Internet server, from a malicious attack launched by a vandal who uses information provided by his own offensive vulnerability scanner to optimize the attack. The foregoing description is illustrative rather than limiting, however, and the present invention is limited only by the following claims.

We claim:

1. A method for protecting a data processing system against attack by a vandal, the method comprising the steps of:

determining, by a vulnerability scanner, a first externally visible vulnerability of the data processing system, said first externally visible vulnerability being on a list, said list appearing in a database accessed by the vulnerability scanner;

providing, by the vulnerability scanner to an observation engine, a description of a first instance of a network flow to the data processing system such that the first instance of the network flow is associated with the first externally visible vulnerability;

detecting, by the observation engine, the first instance of the network flow satisfying said description;

instructing, by the observation engine, a blocker to block the detected first instance of the network flow, said instructing being in response to said detecting;

blocking, by the blocker, the first instance of the network flow, said blocking being in response to said instructing; and lifting, by the observation engine, a blocking of a earlier-blocked instance of the network flow, wherein the earlier-blocked instance of the network flow had been blocked due to having satisfied a description of the earlier-blocked instance provided by the vulnerability scanner responsive to the vulnerability scanner having determined a second externally visible vulnerability of the data processing system such that the earlier-blocked instance of the network flow is associated with the second externally visible vulnerability, and wherein the second externally visible vulnerability is on the list.

2. The method of claim 1, wherein said lifting the blocking is in response to an elapse of a specified interval of time following a last known arrival of the earlier-blocked instance at the data processing system.

3. The method of claim 1, wherein said lifting the blocking is in response to an installation of a software patch or upgrade in the data processing system in relation to the earlier externally visible vulnerability.

* * * * *